(12) United States Patent
Arvidsson et al.

(10) Patent No.: US 11,046,367 B2
(45) Date of Patent: Jun. 29, 2021

(54) VEHICLE SIDE STRUCTURE

(71) Applicant: Gestamp Hardtech AB, Lulea (SE)

(72) Inventors: Stefan Arvidsson, Pitea (SE); Kristoffer Lundstrom, High Point, NC (US); Fredrik Lernstal, Lulea (SE); Hans Bodin, Sodra Sunderbyn (SE)

(73) Assignee: Gestamp Hardtech AB, Lulea (SE)

( * ) Notice: Subject to any disclaimer, the term of this patent is extended or adjusted under 35 U.S.C. 154(b) by 0 days.

(21) Appl. No.: 16/647,589

(22) PCT Filed: Jul. 24, 2018

(86) PCT No.: PCT/SE2018/050774
§ 371 (c)(1),
(2) Date: Mar. 16, 2020

(87) PCT Pub. No.: WO2019/059821
PCT Pub. Date: Mar. 28, 2019

(65) Prior Publication Data
US 2020/0231218 A1    Jul. 23, 2020

(30) Foreign Application Priority Data
Sep. 20, 2017 (SE) .................. 1751163-5

(51) Int. Cl.
*B60J 7/00* (2006.01)
*B62D 25/02* (2006.01)
*B62D 21/15* (2006.01)

(52) U.S. Cl.
CPC .......... *B62D 25/025* (2013.01); *B62D 21/157* (2013.01)

(58) Field of Classification Search
CPC ....... Y02T 10/64; Y02T 10/72; Y02T 10/645; Y02T 10/70; B60L 2200/26; B60P 3/08;
(Continued)

(56) References Cited

U.S. PATENT DOCUMENTS 6,705,668 B1    3/2004 Makita et al.
8,007,032 B1 *  8/2011 Craig .................. B62D 21/157
                                              296/187.12

(Continued)

FOREIGN PATENT DOCUMENTS

AU           7610001        3/2002
DE    10 2012 206032        10/2013
(Continued)

*Primary Examiner* — Kiran B Patel
(74) *Attorney, Agent, or Firm* — Mark P. Stone (57) ABSTRACT

A vehicle side structure (100; 101) comprising a side portion (102; 103) extending in a longitudinal direction (104), wherein the side portion comprises a first and a second member (106, 108) extending in the longitudinal direction. The first and second members (106, 108) form a closed space (114). The side portion (102) comprises a reinforcing member (124) located in closed space (114), the reinforcement member (124) extending in the longitudinal direction. The reinforcement member (124) has a first leg (126) and a second leg (128) extending in a direction transverse to the longitudinal direction. Each leg has a foot (130, 132) extending in the longitudinal direction. The first and second legs (126, 129) are joined in a head section (134). Each leg (126, 128) is corrugated, wherein the corrugations of the first and second legs (126, 128) comprise ridges (136, 144) and grooves (138, 142) which extend from the head section (134) to the respective foot (130, 132). Each ridge (136, 144) is more prominent in the head section (134) than at the foot (130, 132).

20 Claims, 8 Drawing Sheets

(58) Field of Classification Search
CPC ....... G07B 15/063; B62D 1/28; G01S 13/931; G01C 21/28
See application file for complete search history.

(56) References Cited

U.S. PATENT DOCUMENTS

| | | | | |
|---|---|---|---|---|
| 8,100,464 | B2* | 1/2012 | Suzaki | B62D 25/04 |
| | | | | 296/193.06 |
| 9,409,605 | B2* | 8/2016 | Shinoda | B62D 25/04 |
| 9,493,190 | B1 | 11/2016 | Alwan et al. | |
| 9,758,193 | B2 | 9/2017 | Boettcher et al. | |
| 10,081,392 | B2* | 9/2018 | Tsuneyama | B62D 21/15 |
| 10,293,860 | B1* | 5/2019 | Cooper | B60L 3/0007 |
| 2002/0043821 | A1 | 4/2002 | Takashina et al. | |
| 2006/0249988 | A1 | 11/2006 | Jones | |
| 2012/0153675 | A1* | 6/2012 | Rawlinson | B62D 25/025 |
| | | | | 296/193.06 |
| 2012/0306239 | A1* | 12/2012 | Tamura | B62D 25/16 |
| | | | | 296/209 |
| 2015/0258956 | A1* | 9/2015 | Sassi | B60R 21/0136 |
| | | | | 701/45 |
| 2017/0050675 | A1 | 2/2017 | Kellner et al. | |
| 2017/0050679 | A1* | 2/2017 | Shirooka | B62D 25/025 |
| 2017/0113730 | A1* | 4/2017 | Sakurada | B62D 21/157 |
| 2017/0233007 | A1* | 8/2017 | Park | B62D 25/04 |
| | | | | 296/203.03 |
| 2018/0065680 | A1* | 3/2018 | Kamimura | B62D 25/025 |
| 2018/0170441 | A1* | 6/2018 | Ando | B62D 27/023 |
| 2019/0217898 | A1* | 7/2019 | Tchepikov | B62D 25/025 |
| 2019/0276084 | A1* | 9/2019 | Sakata | B62D 21/155 |
| 2019/0390491 | A1* | 12/2019 | Yokogawa | E05B 83/38 |
| 2020/0140017 | A1* | 5/2020 | Schuppert | B62D 25/025 |
| 2020/0317271 | A1* | 10/2020 | Hisada | B62D 27/02 |
| 2020/0324818 | A1* | 10/2020 | Karlsson | B62D 25/025 |

FOREIGN PATENT DOCUMENTS

| | | |
|---|---|---|
| DE | 11 2012 005696 | 10/2014 |
| EP | 1 514 769 | 3/2005 |
| EP | 2 080 689 | 7/2009 |
| EP | 2 272 737 | 1/2011 |
| EP | 2 927 101 | 10/2015 |
| JP | 5319301 | 6/2009 |
| JP | 2010274848 | 12/2010 |
| WO | WO 90/03921 | 4/1990 |
| WO | WO 2015/136476 | 9/2015 |
| WO | WO 2016/169852 | 10/2016 |

* cited by examiner

VEHICLE SIDE STRUCTURE

TECHNICAL FIELD

Aspects of the present invention relate to a vehicle side structure including a side portion extending in a longitudinal direction, wherein the side portion comprises a first member extending in the longitudinal direction and a second member extending in the longitudinal direction, the first member being configured to face the inside of a vehicle, and the second member being configured to face the outside of the vehicle. The first and second members are attached to one another to form a substantially closed space.

BACKGROUND OF THE INVENTION

In the design of a frame portion of a motor vehicle there is a compromise between weight and strength. An advantageous manner of obtaining a good compromise is to produce a frame portion from one or more metal plates formed into a requested shape, e.g. a hat profile.

A frame portion of a motor vehicle is in general formed to have a certain rigidity since it may receive various impacts from the outside. At the same time, some frame portions should allow deformation for absorbing impacts when receiving an overload, e.g. due to a collision with an external object, e.g. another vehicle or a stationary object, e.g. a tree etc. One example of a vehicle frame portion that should be allowed to deform for absorbing impacts while being rigid is the vehicle side sill structure.

SUMMARY OF THE INVENTION

The inventors of the present invention have found that a vehicle side structure can be further improved.

An object of the present invention is thus to improve a vehicle side structure.

Another object is to improve the performance of a vehicle side structure in collisions.

A further object of the present invention is to improve the deformation of the vehicle side structure for absorbing impacts while improving or maintaining the reinforcement of the vehicle side structure.

The above-mentioned objects of the present invention are attained by providing a vehicle side structure comprising a side portion extending in a longitudinal direction. The side portion comprises a first member extending in the longitudinal direction and a second member extending in the longitudinal direction. The first member is configured to face the inside of a vehicle, and the second member is configured to face the outside of the vehicle. The first and second members are attached to one another to form a substantially closed space between them. The side portion comprises a reinforcing member located in the substantially closed space, the reinforcement member extending in the longitudinal direction. The reinforcement member has a first leg extending in a direction transverse to the longitudinal direction, and the reinforcement member has a second leg extending in a direction transverse to the longitudinal direction. Each leg has a foot extending in the longitudinal direction, wherein the feet of the first and second legs are spaced apart from one another. The first and second legs are joined in a head section. The head section faces the first or second member, and the feet face the other member of the first and second members. Each leg is corrugated in the longitudinal direction, and the corrugations of the first and second legs comprise ridges and grooves. The ridges and grooves extend from the head section to the respective foot, and each ridge is more prominent in the head section than at the foot. It is to be understood that the vehicle may be a motor vehicle.

By the innovative reinforcement member of the vehicle side structure, an advantageous deformation of the vehicle side structure for absorbing impacts is provided while maintaining or improving the rigidity and reinforcement of the vehicle side structure. By the innovative reinforcement member, the performance of the vehicle side structure in collisions is improved. By the vehicle side structure including the innovative reinforcement member, an improved vehicle side structure is provided. The vehicle side structure may be a side structure for a motor vehicle, e.g. a car.

According to an advantageous embodiment of the vehicle side structure according to the present invention, each ridge gradually increases in size from the foot to the head section. By means of this embodiment, the performance of the vehicle side structure in collisions is further improved. Thus, a further improved vehicle side structure is provided.

According to a further advantageous embodiment of the vehicle side structure according to the present invention, the reinforcement member comprises a plurality of member sections. Each member section comprises a ridge and a groove of the first leg, and each member section comprises a ridge and a groove of the second leg. Each member section forms an S-shape in the head section. By this embodiment, a further improved deformation of the vehicle side structure for absorbing impacts is provided, while maintaining or improving the rigidity and reinforcement of a vehicle side structure. By the S-shaped reinforcement member, the performance of the vehicle side structure in collisions is further improved. By the vehicle side structure including the innovative S-shaped reinforcement member, a further improved vehicle side structure is provided.

According to another advantageous embodiment of the vehicle side structure according to the present invention, each groove forms an inner ridge in the region between the first and second legs. Each inner ridge extends from the head section to the respective foot. The inner ridges of the first leg overlap the inner ridges of the second leg in the longitudinal direction. By means of this embodiment, an advantageous deformation of the vehicle side structure for absorbing impacts is provided while maintaining or improving the rigidity and reinforcement of the vehicle side structure.

According to a further advantageous embodiment of the vehicle side structure according to the present invention, each ridge has a recess extending from the head section to the respective foot. By means of this recess in each ridge, an improved rigidity of the reinforcement member is provided while improving the deformation of the vehicle side structure for absorbing impacts. However, said recess may be excluded.

According to another advantageous embodiment of the vehicle side structure according to the present invention, each of the first and second members is a hat profile. Each hat profile has a compartment extending in the longitudinal direction, each compartment having a bottom surface. The hat profiles are attached to one another such that the compartments form the substantially closed space. The feet of the first and second legs are situated in the same compartment. By means of this embodiment, an advantageous deformation of the vehicle side structure for absorbing impacts is provided, while maintaining or improving the rigidity and reinforcement of the vehicle side structure. By means of this embodiment, the performance of a vehicle side structure in collisions is improved.

According to yet another advantageous embodiment of the vehicle side structure according to the present invention, the feet of the first and second legs are attached to the same bottom surface of the first or second member. By means of this embodiment, an advantageous deformation of the vehicle side structure for absorbing impacts is provided, while maintaining or improving the rigidity and reinforcement of a vehicle side structure.

According to still another advantageous embodiment of the vehicle side structure according to the present invention, each foot of the first and second legs along its longitudinal extension is attached to the bottom surface of the first or second member. By means of this embodiment, an advantageous deformation of the vehicle side structure for absorbing impacts is provided, while maintaining or improving the rigidity and reinforcement of a vehicle side structure.

According to yet another advantageous embodiment of the vehicle side structure according to the present invention, each foot of the first and second legs along its entire longitudinal extension is attached to the bottom surface of the first or second member. By means of this embodiment, an advantageous deformation of the vehicle side structure for absorbing impacts is provided, while maintaining or improving the rigidity and reinforcement of a vehicle side structure.

According to a further advantageous embodiment of the vehicle side structure according to the present invention, the head section is situated in the compartment of the first or second member.

According to another advantageous embodiment of the vehicle side structure according to the present invention, the head section is attached to the bottom surface of the first or second member. Hereby, the rigidity of the vehicle side structure may be further improved.

According to still another advantageous embodiment of the vehicle side structure according to the present invention, the reinforcement member is formed from a plate, e.g. a metal plate. This is an efficient way to produce the reinforcement member.

According to yet another advantageous embodiment of the vehicle side structure according to the present invention, each of the first and second members is formed from a plate, e.g. a metal plate. This is an efficient way to produce the first and second members.

According to an advantageous embodiment of the vehicle side structure according to the present invention, the side portion is a side sill portion, and the side sill portion extends in a longitudinal direction of a vehicle body and is provided at a side of the vehicle body. By means of this embodiment, an advantageous deformation of the vehicle side structure having a side sill portion for absorbing impacts is provided, while maintaining or improving the rigidity and reinforcement of a vehicle side structure. The innovative reinforcement member is especially advantageous for a side sill portion of the vehicle side structure, where impacts should be absorbed upon certain collisions.

According to a further advantageous embodiment of the vehicle side structure according to the present invention, the side sill portion is connected to at least one cross beam of the vehicle body.

The above-mentioned features and embodiments of the vehicle side structure respectively, may be combined in various possible ways providing further advantageous embodiments.

Further advantageous embodiments of the vehicle side structure according to the present invention and further advantages with the embodiments of the present invention emerge from the dependent claims and the detailed description of embodiments.

BRIEF DESCRIPTION OF THE DRAWINGS

The present invention will now be described, for exemplary purposes, in more detail by way of embodiments and with reference to the enclosed drawings, in which.

DETAILED DESCRIPTION OF EMBODIMENTS

Figure 1:
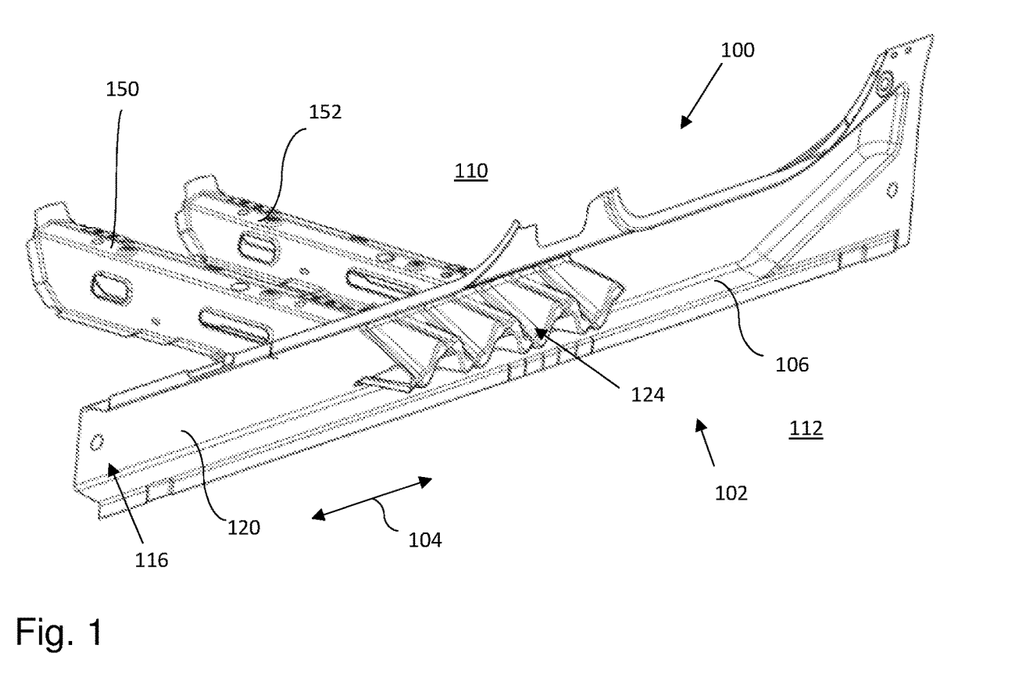
FIG. 1 is a schematic perspective view of an embodiment of the vehicle side structure according to the present invention.
Figure 3:
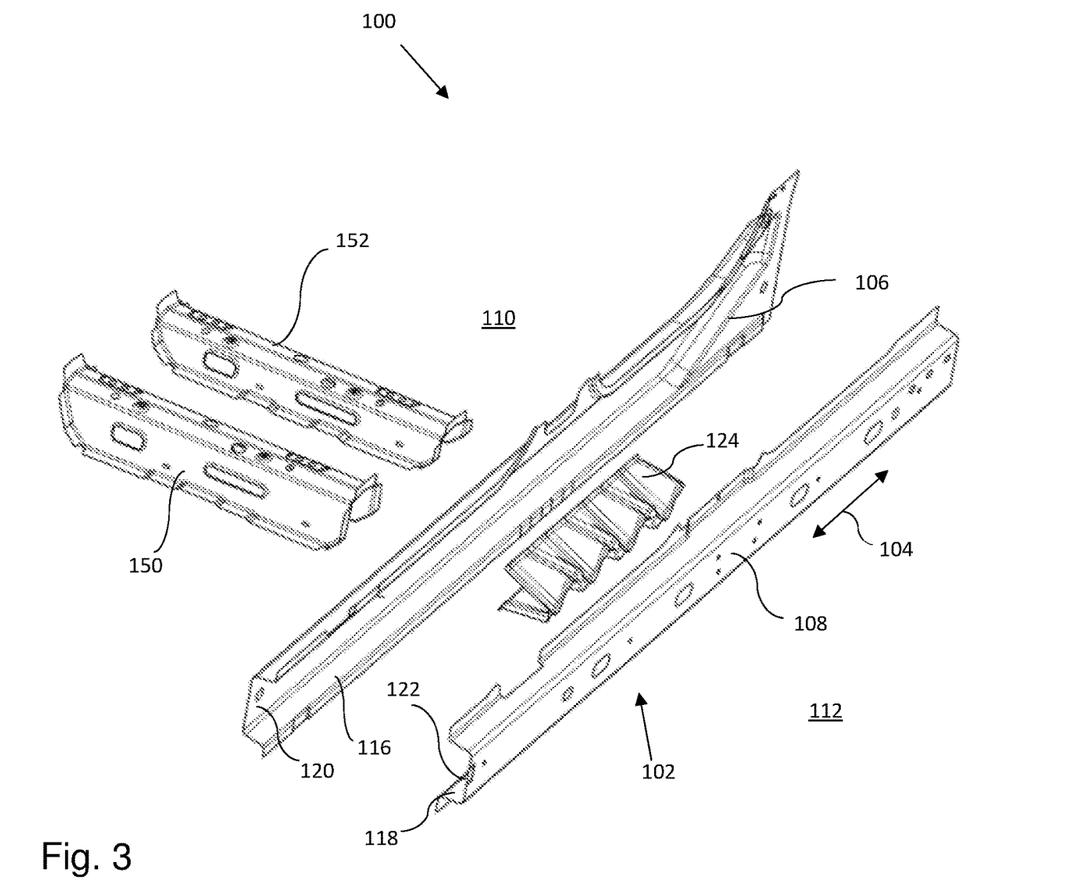
FIG. 3 is an exploded perspective view of the vehicle side structure of FIG. 1.
Figure 4:
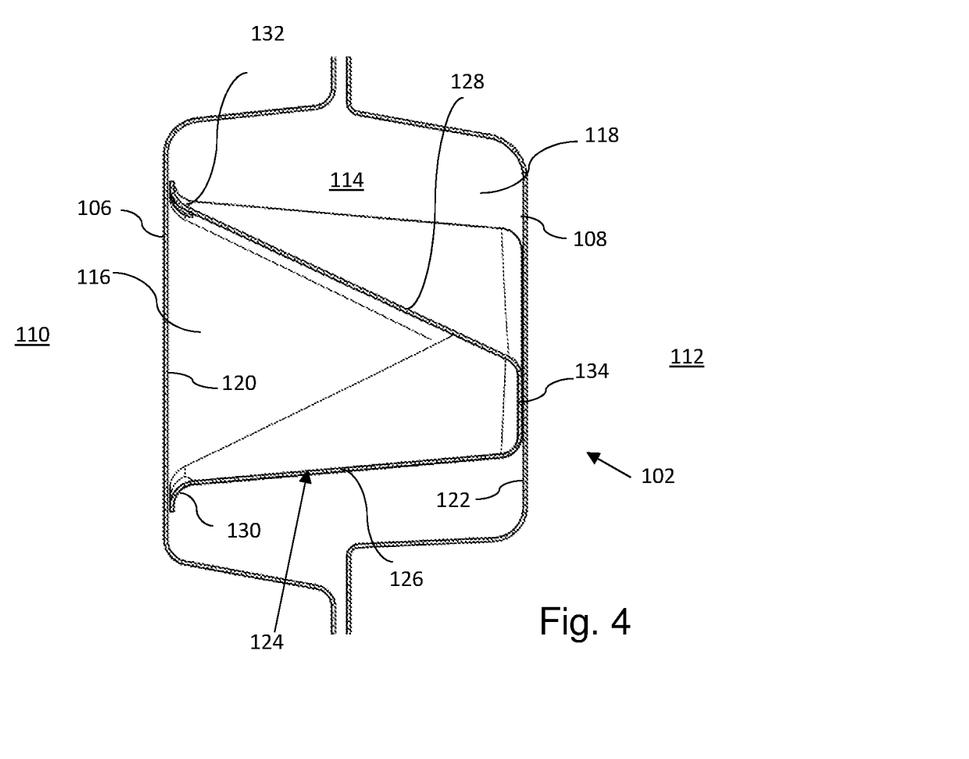
FIG. 4 is a cross-section the side portion of the vehicle side structure of FIG. 1 including the second member.
Figure 5:
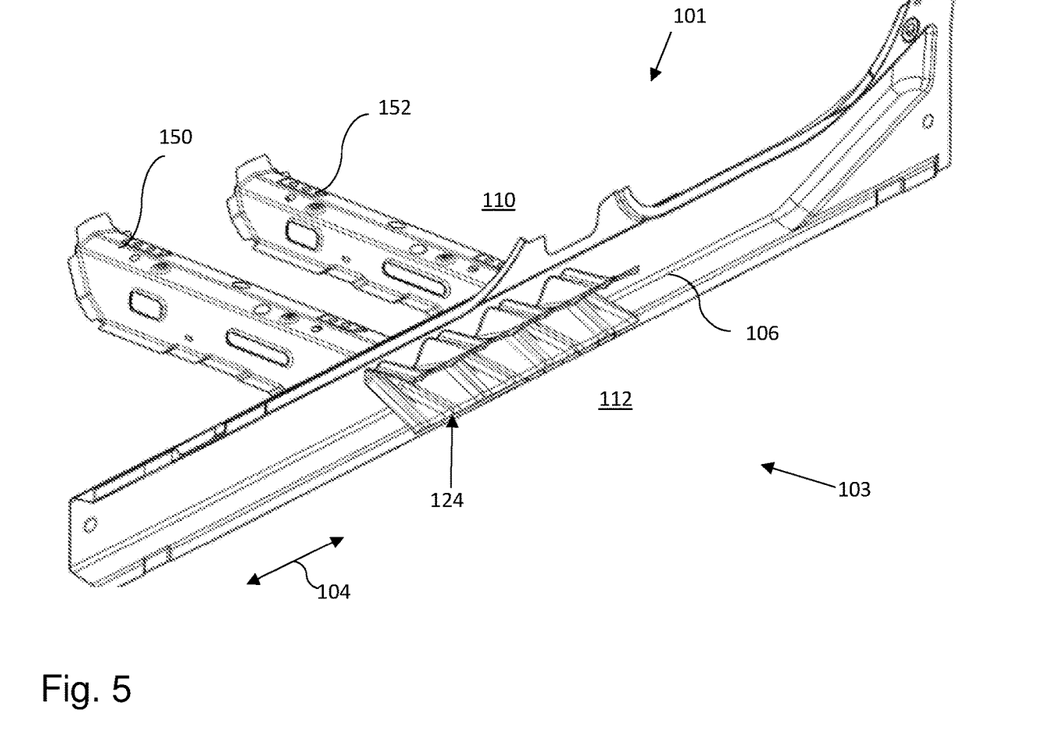
FIG. 5 is a schematic perspective view of another embodiment of the vehicle side structure according to the present invention.
Figure 6:
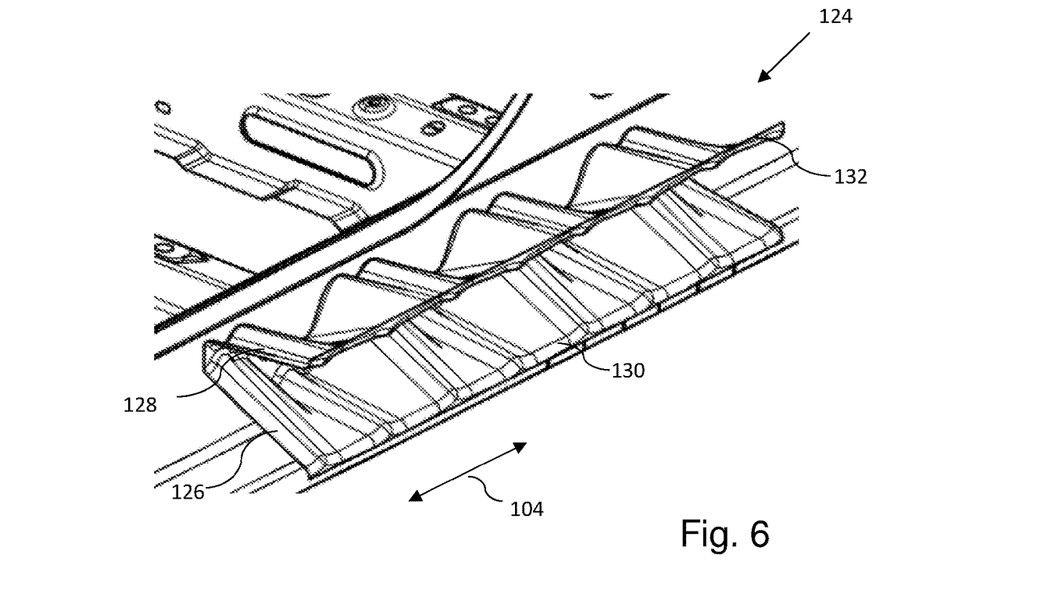
FIG. 6 is an enlargement of a portion of the vehicle side structure of FIG. 5 illustrating the reinforcing member of the vehicle side structure.
Figure 7:
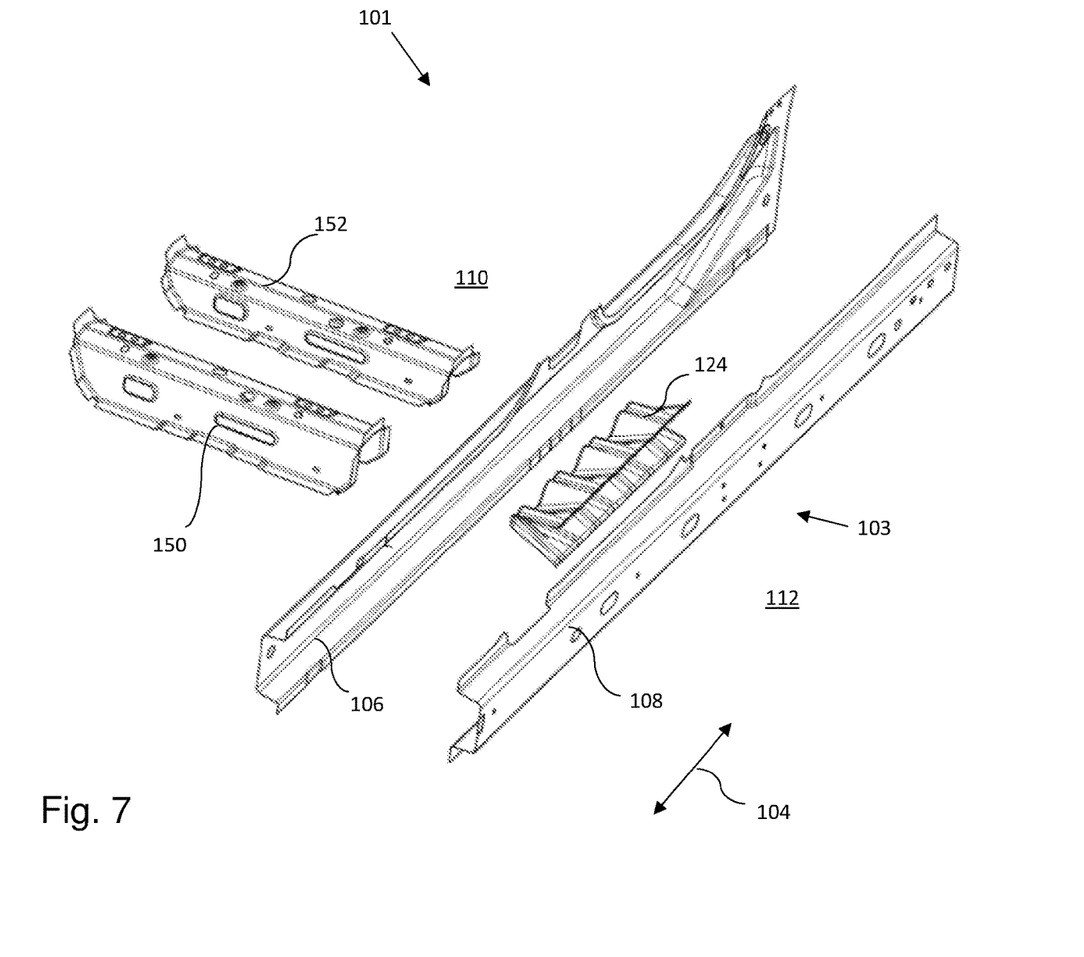
FIG. 7 is an exploded perspective view of the vehicle side structure of FIG. 5.
Figure 8:
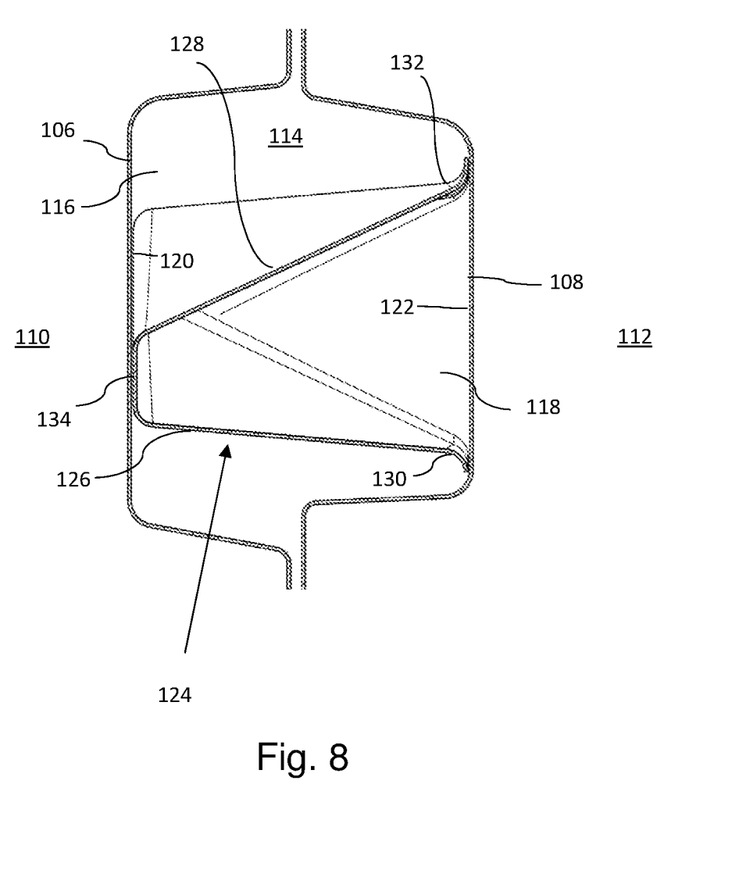
FIG. 8 is a cross-section the side portion of the vehicle side structure of FIG. 5 including the second member.

FIG. 1 schematically shows a partial view an embodiment of the vehicle side structure 100 according to the invention. The vehicle side structure may be a side structure for a motor vehicle, e.g. a car. The vehicle side structure 100 includes a side portion 102 extending in a longitudinal direction 104. The side portion 102 includes a first member 106 extending in the longitudinal direction 104 and a second member 108 (see FIG. 3) extending in the longitudinal direction 104. In the present embodiment, each of the first and second members 106, 108 is formed from a plate, e.g. metal plate, or a plate of another suitable material. The first member 106 is configured to face the inside 110 of a vehicle, and the second member 108 is configured to face the outside 112 of the vehicle. It is to be understood that additional sections or an additional member may be placed between the first or second member 106, 108 and the inside or outside 110, 112 of the vehicle, especially when the vehicle is assembled. With reference to FIG. 4, the first and second members 106, 108 are attached to one another to form a substantially closed space 114 between them. Each of the first and second members 106, 108 may be a hat profile. With reference to FIGS. 3-4, each hat profile has a compartment 116, 118 extending in the longitudinal direction 104. Each compartment 116, 118 has a bottom surface 120, 122. The hat profiles are attached to one another such that the compartments 116, 118 form the above-mentioned closed space 114.

Figure 2:
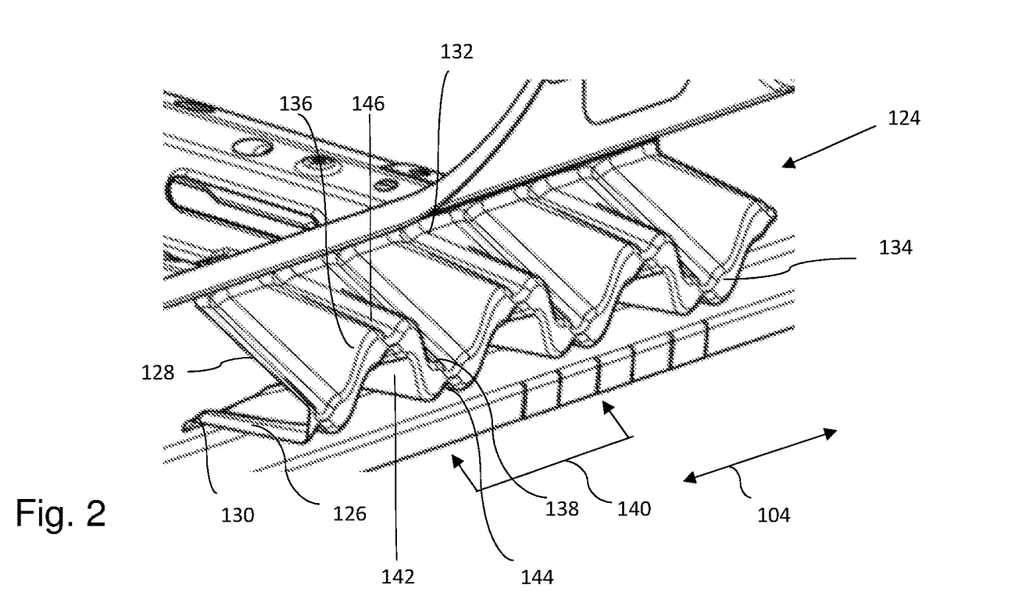
FIG. 2 is an enlargement of a portion of the vehicle side structure of FIG. 2 illustrating the reinforcing member of the vehicle side structure.

The side portion 102 comprises a reinforcing member 124 located in the closed space 114. The reinforcement member 114 extends in the longitudinal direction 104. In the present embodiment, the reinforcement member 124 is formed from a plate, e.g. a metal plate, or a plate of another suitable material. With reference to FIGS. 2 and 4, the reinforcement member 124 has a first leg 126 extending in a direction transverse/perpendicular to the longitudinal direction 104. The reinforcement member 124 also has a second leg 128 extending in a direction transverse/perpendicular to the longitudinal direction 104. In addition, each leg 126, 128 may also be described as extending in the longitudinal direction 104. Each leg 126, 128 has a foot 130, 132 extending in the longitudinal direction 104. The feet 130, 132 of the first and second legs 126, 128 are spaced apart from one another. Each foot 130, 132 may be configured in various ways. With reference to the embodiment of FIG. 4, each foot 130, 132 may be a curved portion of the end of the respective leg 126, 128. However, the foot 130, 132 may also be a straight portion of the end of the respective leg 126, 128. The first and second legs 126, 128 are joined in a head section 134. By "joined" with regard to the first and second legs 126, 128 is meant that the two legs 128, 128 are connected or attached to one another in the head section 134. The legs 126, 128 and the head section 134 can be described as forming a U-shape or V-shape, with a foot 130, 132 at each end of the U-shape or V-shape.

In the present embodiment, the head section 134 faces the second member 108, and the feet 130, 132 face the first member 106. Each leg 126, 128 is corrugated in the longitudinal direction 104. With reference to FIG. 2, the corrugations of the first and second legs 126, 128 comprise ridges 136, 144 and grooves 138, 142, the ridges and grooves extending from the head section 134 to the respective foot 130, 132. Each ridge 136, 144 is more prominent in the head section 134 than at the foot 130, 132. By "prominent" is meant that each ridge 136, 144 is bigger in the head section 134 than at the foot 130, 132. As shown in FIG. 2, each ridge 136 gradually increases in size from the foot 132 to the head section 134. By these innovative corrugations, an advantageous deformation of the vehicle side structure for absorbing impacts is attained, while maintaining or improving the rigidity and reinforcement of a vehicle side structure.

The reinforcement member 124 can be described as comprising a plurality of member sections 140. Each member section 140 includes a ridge 144 and a groove 142 of the first leg 126, and each member section 140 includes a ridge 136 and a groove 138 of the second leg 128. Each member section 140 forms an S-shape in the head section 134. This distinct S-shape further improves the performance of the vehicle side structure. The member sections 140 may be identical or may be different from one another. For example, the S-shape of one member section may be less distinct in relation to another member section.

With reference to FIG. 2, each ridge 136 may also have a recess 146 which extends from the head section 134 to the respective foot 132. The recess 146 improves the performance of the reinforcement member 124 by making it more rigid, and thus improves the performance of the vehicle side structure. The plurality of member sections can include at least two member sections, e.g. two or more, such as three or four etc.

The feet 130, 132 of the first and second legs 126, 128 are both situated in the compartment 116 of the first member 106. Both of the feet 130, 132 of the first and second legs 126, 128 may be attached to the bottom surface 120 of the first member 106. Each foot 130, 132 of the first and second legs 126, 128 along its entire longitudinal extension is attached, e.g. by welding, by way of an adhesive, by a mechanical locking structure, such as rivets, or any other suitable fastening means, to the bottom surface 120 of the first member 106. The head section 134 is situated in the compartment 118 of the second member 108. The head section 134 may be attached to the bottom surface 122 of the second member 108, e.g. by means of an adhesive, or any other suitable means of attachment. The described side portion 102 is advantageously used as a side sill portion 102, where the side sill portion 102 extends in a longitudinal direction 104 of a vehicle body and is provided at a side of the vehicle body. Advantageously, the side sill portion is connected to at least one cross beam 150, 152, e.g. two cross beams 150, 152, of the vehicle body.

FIGS. 5-8 show a second embodiment of the vehicle side structure 101 including a side portion 103. The difference in relation to FIGS. 1-4 is that the reinforcement member 124 is turned around, so that the feet 130, 132 of the first and second legs 126, 128 are facing and are attached to the second member 108 which in turn is configured to face the outside 112 of the vehicle. The head section 134 is facing the first member 106.

Figure 9:
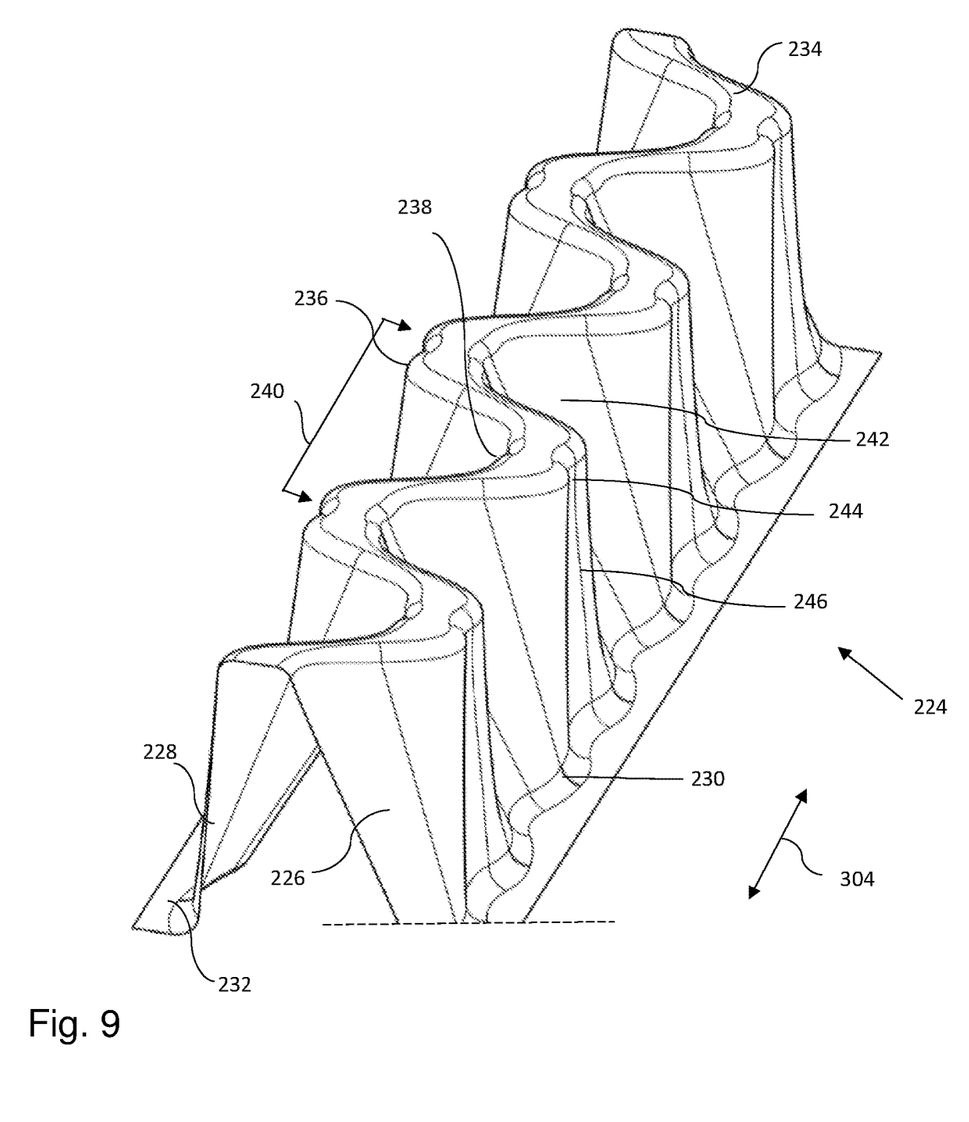
FIG. 9 is a schematic perspective view of a further embodiment of the reinforcing member of the vehicle side structure according to the present invention.

FIG. 9 schematically illustrates another embodiment of the reinforcing member 224 of an embodiment of the vehicle side structure according to the present invention, where each leg 226, 228 is corrugated in the longitudinal direction 304. In FIG. 9, each ridge 236, 244 is even more prominent in the head section 234 than at the foot 230, 232 compared to the embodiments disclosed in FIGS. 1-8. In the embodiment of FIG. 9, each foot 230, 232 is less straight and more wavy in relation to the feet 130, 132 of the embodiments of FIGS. 1-8, which improves the attaching of the foot 230, 232 to the bottom surface 120, 122 of the first or second member 106, 108, e.g. by welding, by way of adhesive means, by a mechanical locking structure, such as rivets, or any other suitable fastening means. Otherwise, the reinforcement member 224 is configured to be positioned and mounted in the same manner as the reinforcement member 124 of FIGS. 1-8. The reinforcement member 224 of FIG. 9 also comprises a plurality of member sections 240, wherein each member section 240 comprises a ridge 244 and a groove 242 of the first leg 226, and each member section 240 comprises a ridge 236 and a groove 238 of the second leg 228. Each member section 240 forms an S-shape in the head section 234. Compared to the embodiments of FIGS. 1-8, the reinforcement member 224 of FIG. 9 has an even more distinct S-shape in the head section 234. Further, in the reinforcement member 224 of FIG. 9, each ridge 244 has a recess 246 extending from the head section 234 to the respective foot 230.

Figure 10:
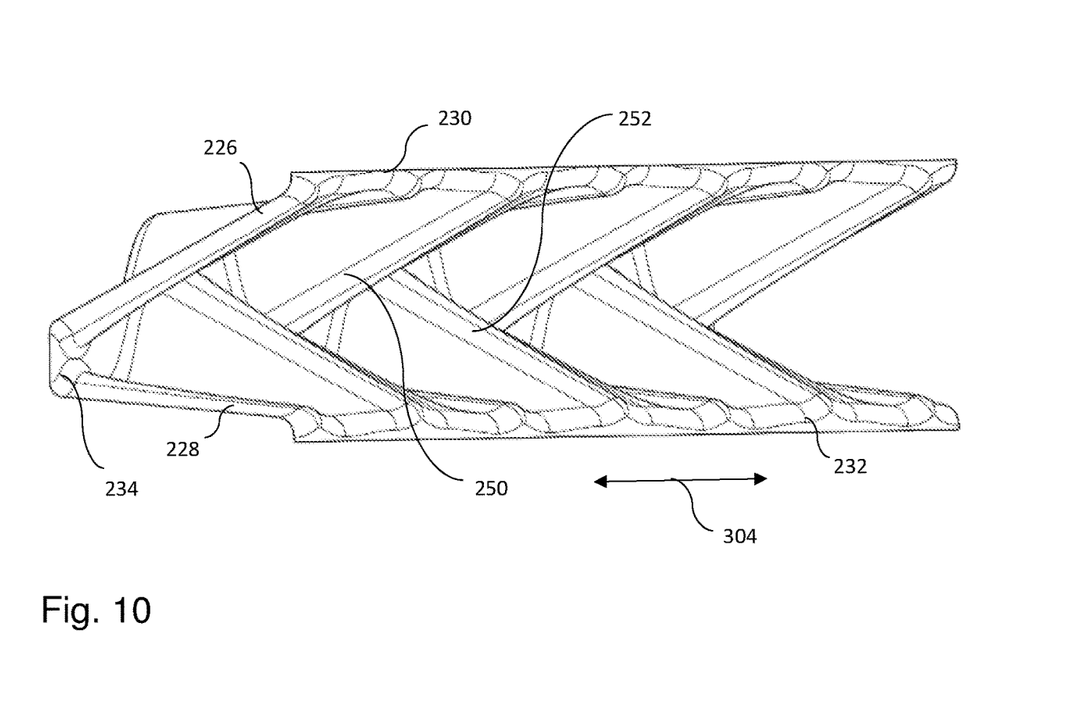
FIG. 10 is a schematic perspective view of the reinforcing member shown in FIG. 9.

With reference to FIG. 10, which schematically shows the inside of the reinforcement member 224 of FIG. 9, but with each recess 246 excluded, it is illustrated that each groove 238, 242 forms an inner ridge 250, 252 in the region between the first and second legs 226, 228. A ridge 236, 244 not being an inner ridge is simply called a "ridge" 236, 244 in the present disclosure. However, a ridge 236, 244 not being an inner ridge could be called an "outer ridge". Each inner ridge 250, 252 extends from the head section 234 to the respective foot 230, 232. The inner ridges 250 of the first leg 226 overlap the inner ridges 252 of the second leg 228 in the longitudinal direction 304. More precisely, in the region of the head section 234, the inner ridges 250 of the first leg 226 overlap the inner ridges 252 of the second leg 228 in the longitudinal direction 304

The features of the different embodiments of the vehicle side structure disclosed above may be combined in various possible ways providing further advantageous embodiments.

The invention shall not be considered limited to the embodiments illustrated, but can be modified and altered in many ways by one skilled in the art, without departing from the scope of the appended claims.

The invention claimed is:

1. A vehicle side structure (100; 101) comprising a side portion (102; 103) extending in a longitudinal direction (104), wherein the side portion (102) comprises a first member (106) extending in the longitudinal direction and a second member (108) extending in the longitudinal direction (104), the first member (106) being configured to face the inside (1 10) of a vehicle, and the second member (108) being configured to face the outside (1 12) of the vehicle, wherein the first and second members (106, 108) are attached to one another to form a substantially closed space (1 14) between them, wherein the side portion (102) comprises a reinforcing member (124) located in the substantially closed space (1 14), the reinforcement member (124) extending in the longitudinal direction (104), wherein the reinforcement member (124) has a first leg (126) extending in a direction transverse to the longitudinal direction (104), wherein the reinforcement member (124) has a second leg (128) extending in a direction transverse to the longitudinal direction (104), wherein each leg has a foot (130, 132) extending in the longitudinal direction (104), wherein the feet (130, 132) of the first and second legs (126, 128) are spaced apart from one another, wherein the first and second legs (126, 128) are joined in a head section (134), wherein the head section (134) faces the first or second member (106, 108), and the feet (130, 132) face the other member (106, 108) of the first and second members (106, 108), wherein each leg (126, 128) is corrugated in the longitudinal direction (104), wherein the corrugations of the first and second legs (126, 128) comprise ridges (136, 144) and grooves (138, 142), the ridges (136, 144) and grooves (138, 142) extending from the head section (134) to the respective foot (132, 130), characterized in that each ridge (136, 144) is more prominent in the head section (134) than at the foot (130, 132).

2. A vehicle side structure according to claim 1, characterized in that each ridge (136, 144) gradually increases in size from the foot (130, 132) to the head section (134).

3. A vehicle side structure according to claim 1, characterized in that the reinforcement member (124; 224) comprises a plurality of member sections (140; 240), wherein each member section (140; 240) comprises a ridge (144; 244) and a groove (142; 242) of the first leg (126; 226), wherein each member section (140; 240) comprises a ridge (136; 236) and a groove (138; 238) of the second leg (128; 228), and wherein each member section (140; 240) forms an S-shape in the head section.

4. A vehicle side structure according to claim 1, characterized in that each groove (238, 242) forms an inner ridge (250, 252) in the region between the first and second legs (226, 228), each inner ridge (250, 252) extending from the head section (234) to the respective foot (230, 232), and in that the inner ridges (250) of the first leg (226) overlap the inner ridges (252) of the second leg (228) in the longitudinal direction (304).

5. A vehicle side structure according to claim 1, characterized in that each ridge (136) has a recess (146) extending from the head section (134) to the respective foot (132).

6. A vehicle side structure according to claim 1, characterized in that each of the first and second members (106, 108) is a hat profile, each hat profile having a compartment (116, 118) extending in the longitudinal direction (104), each compartment (116, 118) having a bottom surface (120, 122), in that the hat profiles are attached to one another such that the compartments (116, 118) form the substantially closed space (114), and in that the feet (130, 132) of the first and second legs (126, 128) are situated in the same compartment (116, 118).

7. A vehicle side structure according to claim 6, characterized in that the feet (130, 132) of the first and second legs (126, 128) are attached to the same bottom surface (120, 122) of the first or second member (106, 108).

8. A vehicle side structure according to claim 7, characterized in that each foot (130, 132) of the first and second legs (126, 128) along its longitudinal extension is attached to the bottom surface (120, 122) of the first or second member (106, 108).

9. A vehicle side structure according to claim 8, characterized in that each foot (130, 132) of the first and second legs (126, 128) along its entire longitudinal extension is attached to the bottom surface (120, 122) of the first or second member (106, 108).

10. A vehicle side structure according to claim 6, characterized in that the head section (134) is situated in the compartment (116, 118) of the first or second member (106, 108).

11. A vehicle side structure according to claim 6, characterized in that the head section (134) is attached to the bottom surface (120, 122) of the first or second member (106, 108).

12. A vehicle side structure according to claim 1, characterized in that the reinforcement member (124) is formed from a plate, e.g. a metal plate.

13. A vehicle side structure according to claim 1, characterized in that each of the first and second members (106, 108) is formed from a plate, e.g. a metal plate.

14. A vehicle side structure according to claim 1, characterized in that the side portion (102) is a side sill portion (102), and in that the side sill portion (102) extends in a longitudinal direction (104) of a vehicle body and is provided at a side of the vehicle body.

15. A vehicle side structure according to claim 14, characterized in that the side sill portion (102) is connected to at least one cross beam (150, 152) of the vehicle body.

16. A vehicle side structure according to claim 2, characterized in that the reinforcement member (124; 224) comprises a plurality of member sections (140; 240), wherein each member section (140; 240) comprises a ridge (144; 244) and a groove (142; 242) of the first leg (126; 226), wherein each member section (140; 240) comprises a ridge (136; 236) and a groove (138; 238) of the second leg (128; 228), and wherein each member section (140; 240) forms an S-shape in the head section.

17. A vehicle side structure according to claim 2, characterized in that each groove (238, 242) forms an inner ridge (250, 252) in the region between the first and second legs (226, 228), each inner ridge (250, 252) extending from the head section (234) to the respective foot (230, 232), and in that the inner ridges (250) of the first leg (226) overlap the inner ridges (252) of the second leg (228) in the longitudinal direction (304).

18. A vehicle side structure according to claim 2, characterized in that each ridge (136) has a recess (146) extending from the head section (134) to the respective foot (132).

19. A vehicle side structure according to claim 2, characterized in that each of the first and second members (106, 108) is a hat profile, each hat profile having a compartment (116, 118) extending in the longitudinal direction (104), each compartment (116, 118) having a bottom surface (120, 122), in that the hat profiles are attached to one another such that the compartments (116, 118) form the substantially closed space (114), and in that the feet (130, 132) of the first and second legs (126, 128) are situated in the same compartment (116, 118).

20. A vehicle side structure according to claim 7, characterized in that the head section (134) is situated in the compartment (116, 118) of the first or second member (106, 108).

\* \* \* \* \*